United States Patent
Okumi et al.

(10) Patent No.: US 9,278,444 B2
(45) Date of Patent: Mar. 8, 2016

(54) HANDHELD WORK MACHINE (75) Inventors: Masayoshi Okumi, Anjo (JP); Masaki Kondo, Anjo (JP)

(73) Assignee: MAKITA CORPORATION, Aichi (JP)

( * ) Notice: Subject to any disclaimer, the term of this patent is extended or adjusted under 35 U.S.C. 154(b) by 566 days.

(21) Appl. No.: 13/698,742

(22) PCT Filed: Apr. 14, 2011

(86) PCT No.: PCT/JP2011/059256
§ 371 (c)(1),
(2), (4) Date: Jan. 2, 2013

(87) PCT Pub. No.: WO2011/145412
PCT Pub. Date: Nov. 24, 2011

(65) Prior Publication Data
US 2013/0104704 A1    May 2, 2013

(30) Foreign Application Priority Data

May 21, 2010    (JP) .................................. 2010-116922

(51) Int. Cl.
*B25F 5/02* (2006.01)
*B23D 45/16* (2006.01)
*B23D 47/00* (2006.01)

(52) U.S. Cl.
CPC . *B25F 5/02* (2013.01); *B23D 45/16* (2013.01); *B23D 47/00* (2013.01)

(58) Field of Classification Search
CPC .......... B25G 1/102; B25G 1/10; B25G 1/105; B25G 1/00; B25G 1/01; B25F 5/02; B23D 45/16; B23D 47/00

USPC ................................ 81/489, 492; 30/381–387
See application file for complete search history.

(56) References Cited

U.S. PATENT DOCUMENTS

| 4,817,291 A * | 4/1989 | Stehle .............................. 30/381 |
| 2005/0138776 A1* | 6/2005 | Guip et al. ...................... 16/421 |
| 2006/0005357 A1 | 1/2006 | Kemmler et al. |
| 2006/0005358 A1* | 1/2006 | Kemmler et al. ............... 16/430 |
| 2006/0123638 A1 | 6/2006 | Wedel et al. |

FOREIGN PATENT DOCUMENTS

| JP | 01-164084 | 11/1989 |
| JP | 2-112249 | 9/1990 |
| JP | 6-2789 | 1/1994 |

(Continued)

OTHER PUBLICATIONS

United Kingdom Office action, mail date is Feb. 18, 2015.
(Continued)

*Primary Examiner* — Robert Scruggs
(74) *Attorney, Agent, or Firm* — Greenblum & Bernstein P.L.C.

(57) ABSTRACT

A handheld work machine comprises a main body comprising a prime mover and a handle fixed to the main body and configured to be gripped by a user. The handle is formed by pipe material and at least one reinforcement member is disposed at a longitudinal portion of the handle that configures a part of the handle. The reinforcement member may be formed by pipe material and preferably disposed inside the handle. The longitudinal portion where the reinforcement member is disposed may preferably include a fixed portion of the handle that is fixed to the main body.

15 Claims, 7 Drawing Sheets

(56) References Cited

FOREIGN PATENT DOCUMENTS

| JP | 11-138333 | 5/1999 |
| JP | 2000-198081 | 7/2000 |
| JP | 2003-96737 | 4/2003 |
| JP | 2006-7774 | 1/2006 |
| JP | 2006-123164 | 5/2006 |

OTHER PUBLICATIONS

International Preliminary Report on Patentability for PCT/JP2011/059256, mailed Dec. 10, 2012.

Japan Office action, dated Apr. 8, 2014 along with an english translation thereof.

International Search Report, dated May 17, 2011 along with an english translation thereof.

Written Opinion of the International Searching Authority, dated May 17, 2011.

Japan Office action, dated Jan. 7, 2014 along with an english translation thereof.

Official Action for GB No. 1221009.2 having a mailing date of Jul. 3, 2015.

* cited by examiner

HANDHELD WORK MACHINE

TECHNICAL FIELD

The present invention relates to a handheld work machine and particularly relates to the structure of a handle for this handheld work machine.

BACKGROUND ART

JP 11-138333 A and JP 2006-7774 A disclose a handheld work machine. The handheld work machine includes a handle fixed to a main body and configured to be gripped by a user. The handle is formed by pipe material and produced by a bending process of the pipe material into a predetermined shape.

SUMMARY OF INVENTION

Technical Problem

The handle for the handheld work machine is applied with a relatively large load due to weight of the handheld work machine or reaction force from a workpiece. When rigidity of the handle is insufficient with respect to such load, the handle is largely bent. When the handle is largely bent, an attitude of the handheld work machine is not stable, and a user finds the handheld work machine hard to use. Therefore, the handle for the handheld work machine requires relatively high rigidity.

In order to increase the rigidity of the handle, it is conceivable to increase a diameter or thickness of the pipe material forming the handle. However, increasing the diameter or thickness of the pipe material causes an increase in weight of the handle, i.e., weight of the handheld work machine. When there is an increase in the weight of the handheld work machine, load on a user holding the handheld work machine also increases, and the user finds the handheld work machine hard to use. In addition, when the diameter of the pipe material is increased, a user may find a thickened handle hard to grip.

In view of a problem described above, the present invention provides an art of reducing bend that occurs in a handle for a handheld work machine without changing pipe material forming the handle.

Solution to Technical Problem

A handheld work machine according to the present invention includes a main body including a prime mover and a handle fixed to the main body and configured to be gripped by a user. The handle is formed by pipe material and at least one reinforcement member is disposed at a longitudinal portion of the handle that configures a part of the handle. The reinforcement member can be disposed selectively with respect to a portion where a large stress may occur. Accordingly, bend of the handle can be reduced effectively without changing the pipe material forming the handle.

The reinforcement member described above is preferably formed by pipe material. When the reinforcement member is hollow pipe material, thickness of the reinforcement member can be designed appropriately in accordance with rigidity required for the handle. Accordingly, while reducing the bend of the handle, weight of the handheld work machine can also be reduced. Note that the reinforcement member does not necessarily need to be pipe material and may be, for example, solid bar material.

The reinforcement member described above is preferably disposed inside the handle. With this configuration, the reinforcement member is not exposed outside, and an appearance of the handle is not marred. Also, since external dimensions do not change, attaching to the main body can be done in a similar manner as in a conventional handle.

The handle described above preferably includes a fixed portion that is fixed to the main body by a fastener. In this case, the fixed portion in at least one part is preferably located within the longitudinal portion where the reinforcement member is disposed. In the fixed portion of the handle and a surrounding portion thereof, a relatively large stress occurs. Thus, when the reinforcement member is disposed at the longitudinal portion including the concerned fixed portion, the bend of the handle can be reduced effectively.

DETAILED DESCRIPTION OF INVENTION

In one embodiment of the present invention, one reinforcement member may be disposed at a handle. Note that a plurality of reinforcement members instead of one reinforcement member may be disposed at the handle. In this case, the plurality of reinforcement members may be disposed at different longitudinal portions of the handle or may be disposed at a same longitudinal portion of the handle. For example, in a case where two reinforcement members are disposed at the same longitudinal portion, it may be such that one reinforcement member is disposed inside the handle and another reinforcement member is disposed outside (on an outer circumference of) the handle. Alternatively, it may be such that one reinforcement member is disposed inside the handle and another reinforcement member is disposed further inside that reinforcement member.

In one embodiment of the present invention, the handle and the reinforcement member are preferably made of same material. In this case, the handle and the reinforcement member are preferably made of metal material such as aluminum, for example. Note that the handle and the reinforcement member may be made of another material such as, for example, resin material instead of the metal material. In addition, the handle and the reinforcement member do not necessarily need to be made of the same material and may be made of different materials.

In one embodiment of the present invention, it is preferable that the handle includes a plurality of curved portions and at least one curved portion be located within the longitudinal portion where the reinforcement member is disposed. With this configuration, displacement of the reinforcement member, i.e., movement of the reinforcement member with respect to the handle can be prevented.

In one embodiment of the present invention, the handle is preferably fixed to a main body using a plurality of bolts (or screws). In this case, at least one bolt preferably penetrates the handle and the reinforcement member and is tightened to the main body. With this structure, the displacement of the reinforcement member, i.e., the movement of the reinforcement member with respect to the handle can be prevented.

In one embodiment of the present invention, a handheld work machine may include a rotating tool. Herein, in the handheld work machine including the rotating tool, reaction force from a workpiece is generated in a direction perpendicular with respect to an axis of rotation of the rotating tool. Thus, a handle for the handheld work machine is easily bent particularly in a longitudinal portion extending along a plane perpendicular to the axis of rotation of the rotating tool. Therefore, in a case where the handheld work machine includes the rotating tool, a reinforcement member is preferably disposed at the longitudinal portion that configures a part of the handle and that extends along the plane perpendicular to the axis of rotation of the rotating tool.

EMBODIMENT

Figure 1:
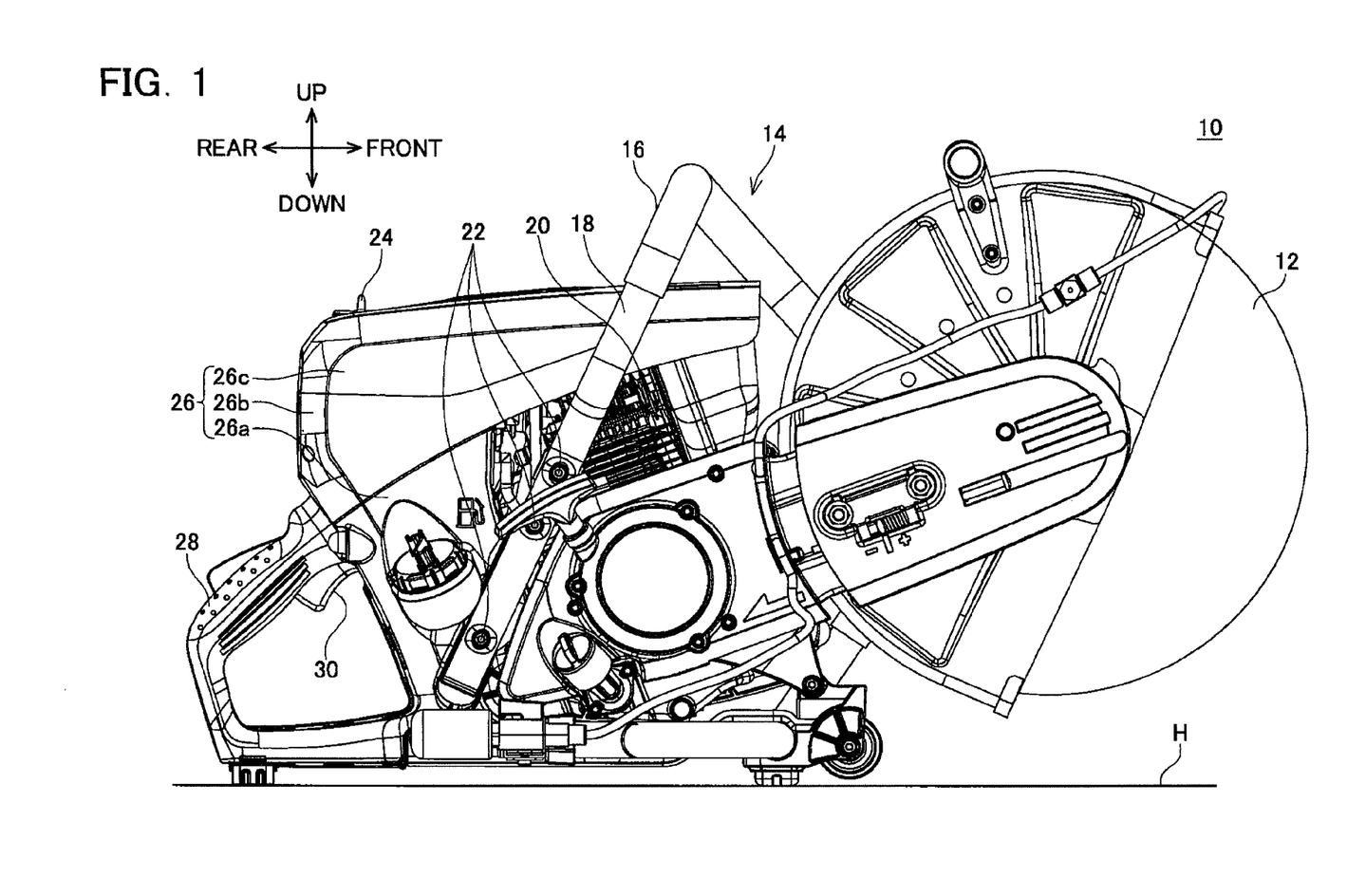
FIG. 1 is a side view of an engine-driven cutter of a working example when seen from the right.
Figure 2:
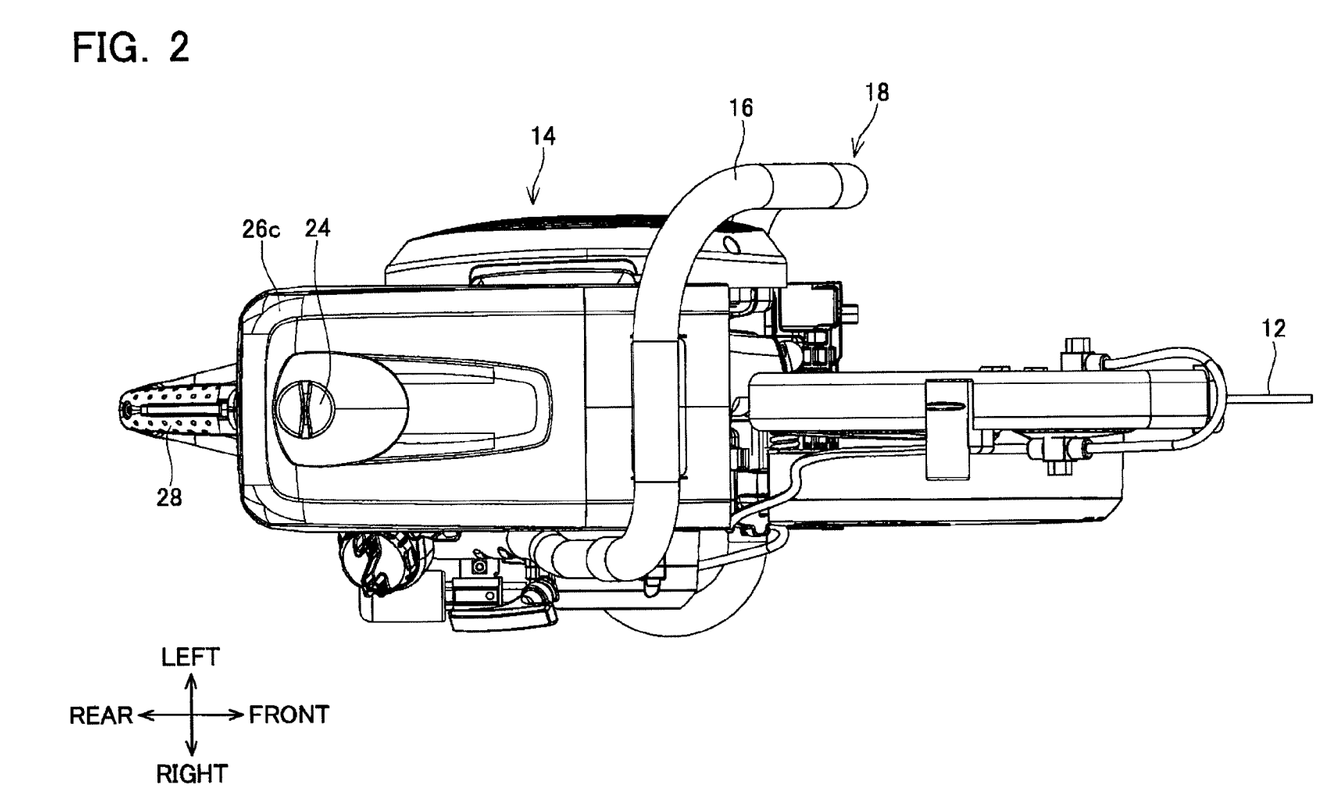
FIG. 2 is a plan view of the engine-driven cutter of the working example when seen from above.

An engine-driven cutter 10 as an embodiment of the present invention will be described with reference to the drawings. The engine-driven cutter 10 is one example of a handheld work machine (handheld power tool). FIG. 1 shows a side view of the engine-driven cutter 10, and FIG. 2 shows a plan view of the engine-driven cutter 10. The engine-driven cutter 10 includes a main body 14 and a rotary blade 12 rotatably supported by the main body 14. The main body 14 includes an engine 20 that drives the rotary blade 12. The engine-driven cutter 10 is used, for example, to cut a workpiece such as concrete or steel frame material at a building site.

As shown in FIG. 1 and FIG. 2, the rotary blade 12 is located on one side in a horizontal direction with respect to the main body 14 when the engine-driven cutter 10 is placed on a horizontal surface H. In the description below, a state where the engine-driven cutter 10 is placed on the horizontal surface H is assumed as a reference, and one side in the horizontal direction on which the rotary blade 12 is located with respect to the main body 14 is referred to as front, while an opposite direction thereto is referred to as rear. Also, vertically above is simply referred to as above, while vertically below is simply referred to as below. Also, as shown in FIG. 2, one side in a horizontal direction perpendicular to a front-rear direction is referred to as left, while another side in the horizontal direction perpendicular to the front-rear direction is referred to as right. Thus, for example, it can be expressed that the rotary blade 12 is located in a front of the main body 14 with an axis of rotation thereof extending in a left-right direction. The rotary blade 12 is located above the horizontal surface H and is held to be perpendicular with respect to the horizontal surface H.

A front handle 18 and a rear grip 28 are disposed at the main body 14. The front handle 18 is located in a front portion of the main body 14, and the rear grip 28 is located in a rear portion of the main body 14. A throttle lever 30 is disposed at the rear grip 28. Normally, a user grips the front handle 18 with a left hand and grips the rear grip 28 with a right hand to hold the engine-driven cutter 10. Then, when the user pulls the throttle lever 30, the engine 20 drives the rotary blade 12. The user can cut a workpiece by causing the rotary blade 12 to contact the workpiece.

The front handle 18 is formed by pipe material, and the pipe material is made into a shape shown in the drawing by a bending process. One end section of the front handle 18 is located to the right of the main body 14 and is fixed to the main body 14 by a plurality of bolts 22. Another end section of the front handle 18 is located below the main body 14 and is fixed to the main body 14 by a plurality of bolts (not shown). A middle portion of the front handle 18 is a portion configured to be gripped by the user and is located above and to the left of the main body 14. A grip cover 16 formed by an elastomer is disposed at the middle portion of the front handle 18. A configuration of the front handle 18 will be described later in detail.

The main body 14 includes a casing 26. The casing 26 is mainly configured of a casing main body 26a, a filter cover 26b, and a top cover 26c. An inside of the casing main body 26a is mainly a fuel tank. Note that the rear grip 28 mentioned earlier is formed integrally with the casing main body 26a.

The top cover 26c is fixed to the filter cover 26b by a thumbscrew 24. By loosening the thumbscrew 24, the user can detach the top cover 26c. A sponge filter (not shown) is disposed inside the top cover 26c. The user can detach the top cover 26c and clean the sponge filter regularly.

Figure 3:
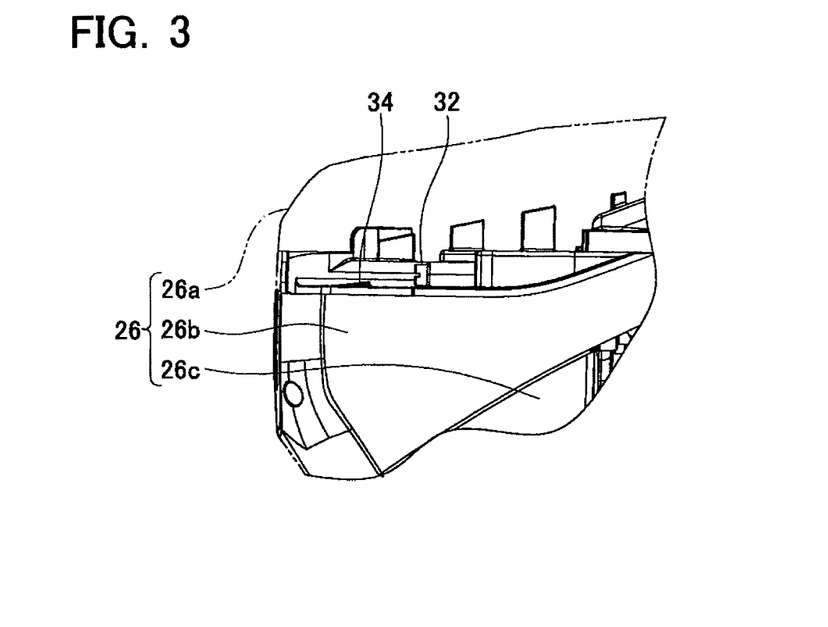
FIG. 3 is a side view showing a state where a top cover of a casing is detached.
Figure 4:
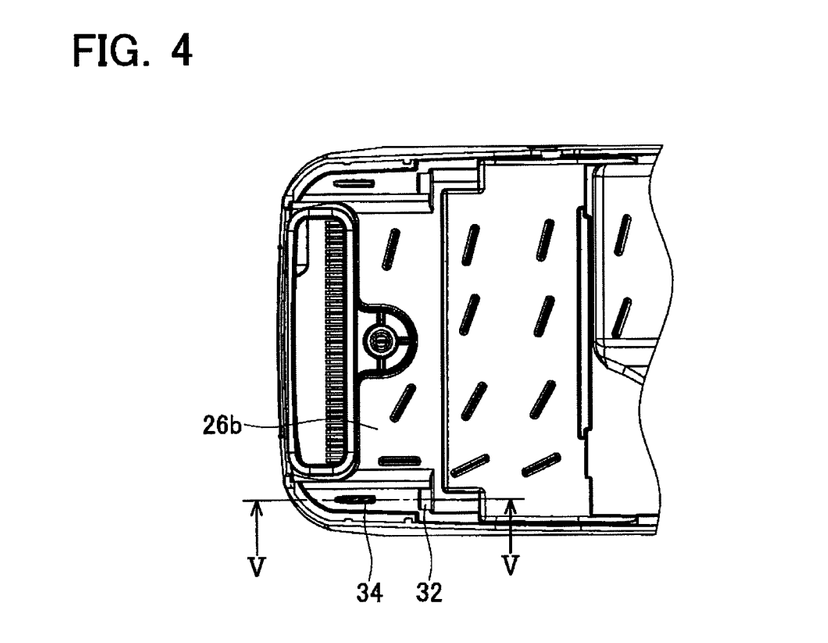
FIG. 4 is a plan view showing a state where the top cover of the casing is detached.
Figure 5:
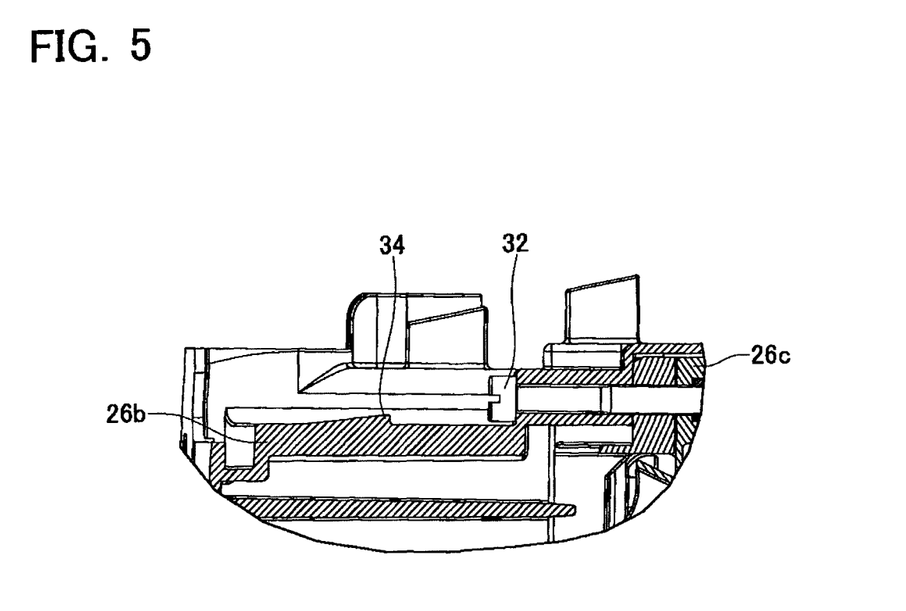
FIG. 5 is a sectional view along line V-V in FIG. 4.

FIG. 3 and FIG. 4 show a state where the top cover 26c is detached. FIG. 5 shows a sectional view along line V-V in FIG. 3. As shown in FIG. 3, FIG. 4, and FIG. 5, the filter cover 26b is fixed to the casing main body 26a by a plurality of bolts 32. By loosening the plurality of bolts 32, a user can detach the filter cover 26b. A paper filter (not shown) is disposed inside the filter cover 26b. The user can detach the filter cover 26b and clean the paper filter regularly.

As shown in FIG. 3, FIG. 4, and FIG. 5, a rib 34 that prevents the bolt 32 from falling is formed in the filter cover 26b. The rib 34 is located on an extended line from the bolt 32 and can contact the loosened bolt 32. Thus, when the user detaches the filter cover 26b, the bolt 32 is prevented from falling from the filter cover 26b. With this structure, it is easy for the user to attach or detach the filter cover 26b, and the detached bolt 32 is prevented from being lost. Note that the rib 34 as such may be disposed similarly to another bolt instead of the bolt 32 for the filter cover 26b.

Figure 6:
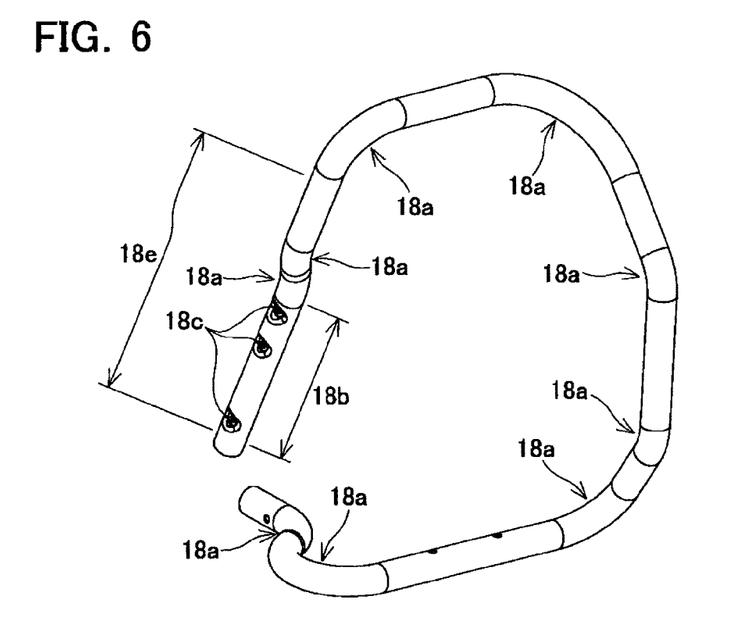
FIG. 6 is a perspective view of a front handle.
Figure 7:
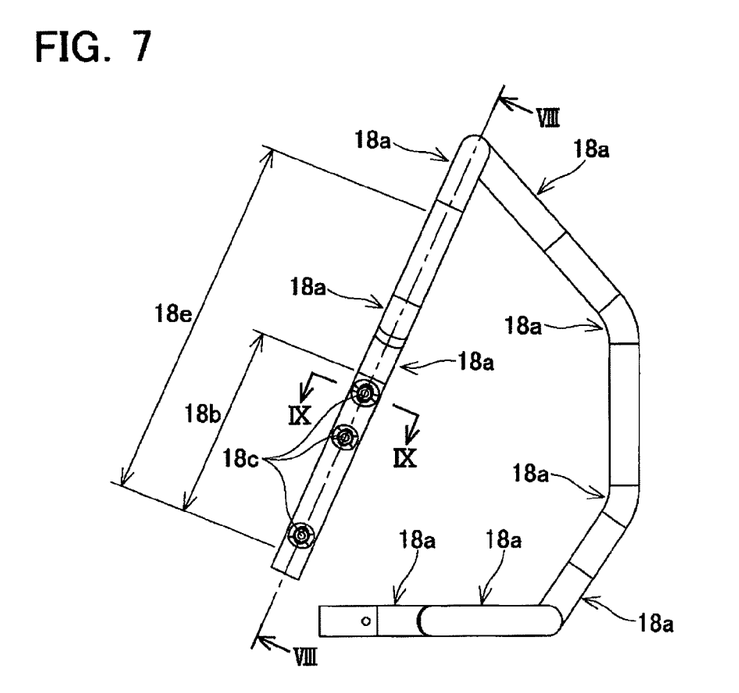
FIG. 7 is a side view of the front handle when seen from the right.
Figure 8:
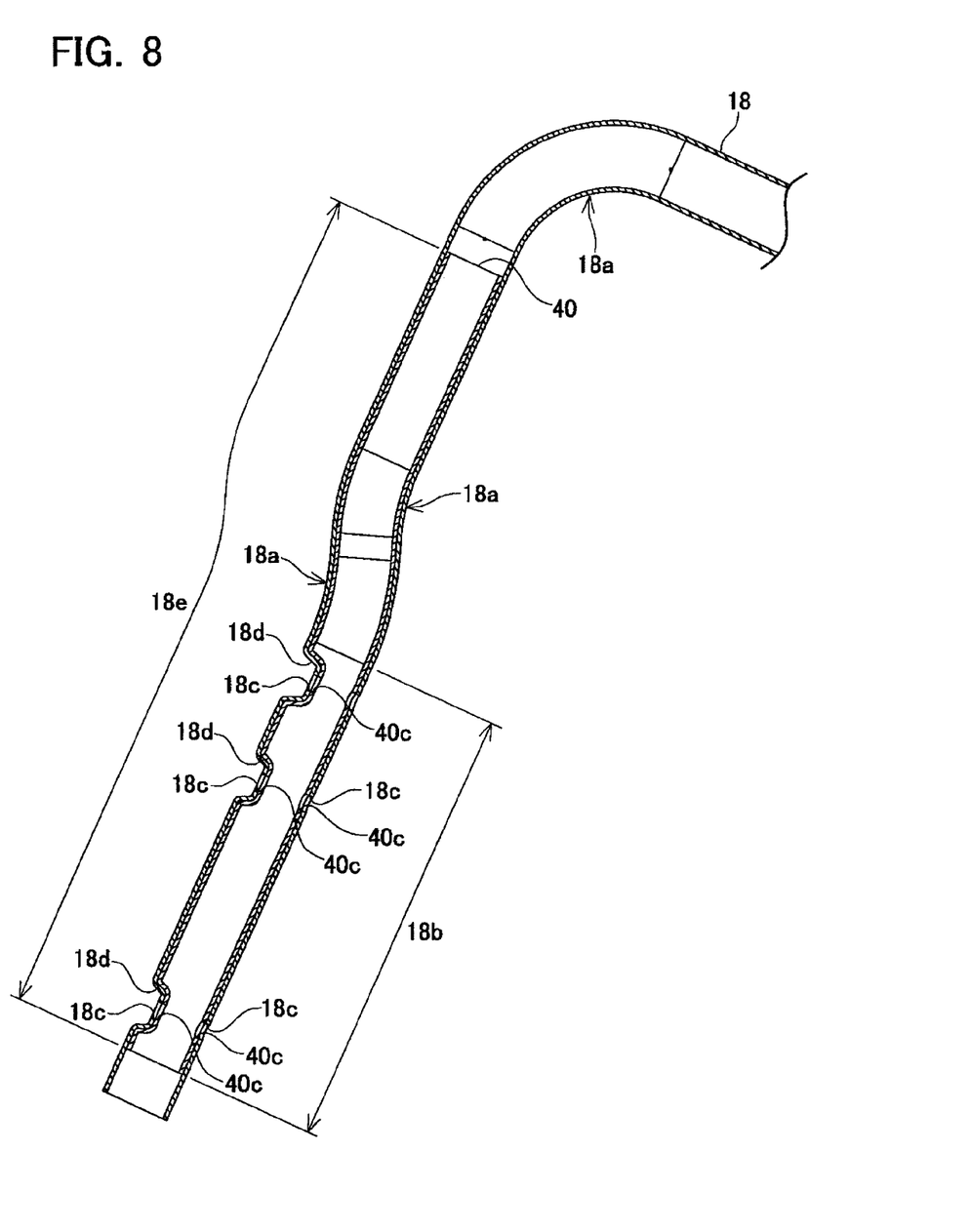
FIG. 8 is a sectional view along line VIII-VIII in FIG. 7
Figure 9:
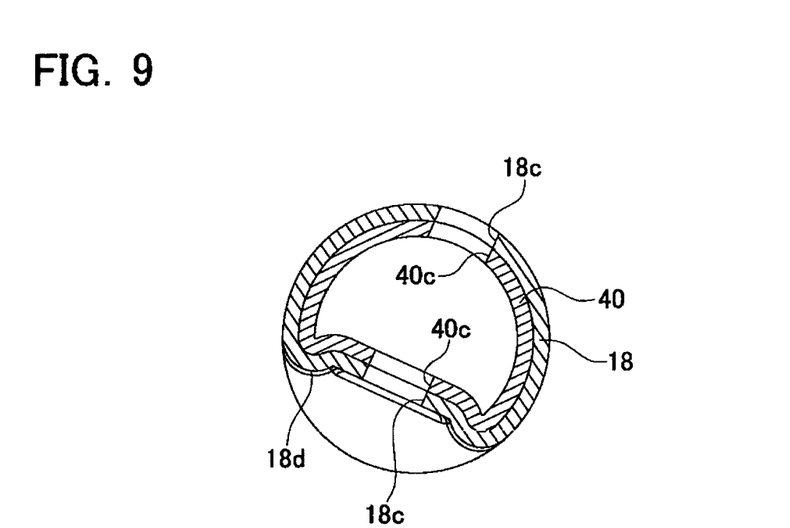
FIG. 9 is a sectional view along line IX-IX in FIG. 7.

Next, the configuration of the front handle 18 will be described with reference to FIG. 6 to FIG. 9. FIG. 6 is a perspective view of the front handle 18, and FIG. 7 is a side view of the front handle 18 when seen from the right. FIG. 8 is a sectional view along line VIII-VIII in FIG. 7, and FIG. 9 is a sectional view along line IX-IX in FIG. 7. Note that, in FIG. 6 to FIG. 9, the grip cover 16 is detached from the front handle 18.

As shown in FIG. 6 to FIG. 9, the front handle 18 is formed of hollow pipe material and has undergone a three-dimensional bending process. Therefore, a plurality of curved portions 18a are formed in the front handle 18. The shape of the front handle 18 is designed in consideration of various factors, such as size or weight of the main body 14, ease of grip for the user, and reaction force received from the workpiece. Note that an appropriate design modification may be made to the shape of the front handle 18.

One end section 18b of the front handle 18 is a portion to be fixed to a right side surface of the main body 14. A plurality of bolt holes 18c are formed in the concerned portion 18b for the bolt 22 (see FIG. 1) that fixes the front handle 18 to the main body 14. Also, as shown in FIG. 8 and FIG. 9, a periphery 18d of each bolt hole 18c is shaped as a recess so that a head section of the bolt 22 is accommodated. The plurality of bolts 22 passes through the bolt hole 18c of the front handle 18 and is tightened to the engine 20 or the casing 26 of the main body 14. A position in which the bolt hole 18 of the front handle 18 is formed is a portion fixed directly to the main body 14 by the bolt 22 and is a fixed portion of the front handle 18 to the main body 14.

As shown in FIG. 8 and FIG. 9, a reinforcement member 40 is disposed at the front handle 18. The reinforcement member 40 is disposed at a longitudinal portion 18e that configures a part of the front handle 18. The reinforcement member 40 is, as one example, made of same aluminum pipe material as in the front handle 18. In the longitudinal portion 18e where the reinforcement member 40 is disposed, the front handle 18 has a double structure of the pipe material, and rigidity thereof is increased. Thus, in the longitudinal portion 18e where the reinforcement member 40 is disposed, bend of the front handle 18 is significantly reduced. By bend of the front handle 18 being reduced, an attitude of the engine-driven cutter 10 becomes stable at a time when the user uses the engine-driven cutter 10. Therefore, the user can easily handle the engine-driven cutter 10.

In the engine-driven cutter 10 of this working example, the reinforcement member 40 is formed by pipe material. When the reinforcement member 40 is hollow pipe material, thickness of the reinforcement member 40 can be designed appropriately in accordance with rigidity required for the front handle 18. Accordingly, while reducing the bend of the front handle 18, the weight of the engine-driven cutter 10 can also be reduced. Note that the reinforcement member 40 does not necessarily need to be pipe material and may be, for example, solid bar material. Also, the reinforcement member 40 may be made of another metal material or non-metal material instead of aluminum.

In the engine-driven cutter 10 of this working example, the reinforcement member 40 is disposed inside the front handle 18 and firmly in contact with an inner surface of the front handle 18. With this configuration, the reinforcement member 40 is not exposed outside, and an appearance of the front handle 18 is not marred. Also, since external dimensions of the front handle 18 do not change, attaching to the main body 14 can be done in a similar manner as in a conventional front handle. In addition, degradation or damage of the reinforcement member 40 can also be prevented. Note that the reinforcement member 40 does not necessarily need to be disposed inside the front handle 18 and may also be disposed outside the front handle 18. In either case, bend of the front handle 18 is significantly reduced by the double structure of the front handle 18 and the reinforcement member 40. Also, the front handle 18 may have a multiple structure by disposing a plurality of reinforcement members 40.

In the engine-driven cutter 10 of this working example, the reinforcement member 40 is disposed at the longitudinal portion 18e including the fixed portion (i.e., position of the bolt hole 18c) of the front handle 18 to the main body 14. In the fixed portion of the front handle 18 and a surrounding portion thereof, a relatively large stress may occur due to weight of the engine-driven cutter 10 or reaction force from a workpiece. Thus, when the reinforcement member 40 is disposed at the longitudinal portion 18e including the fixed portion, bend of the front handle 18 can be reduced effectively. Note that the longitudinal portion 18e where the reinforcement member 40 is disposed does not necessarily need to include the fixed portion and may be designed appropriately in consideration of the stress that may occur in the front handle 18. Also, a plurality of reinforcement members 40 instead of one reinforcement member 40 may be disposed at the front handle 18.

In the engine-driven cutter 10 of this working example, the curved portion 18a that configures a part of the front handle 18 is located within the longitudinal portion 18e where the reinforcement member 40 is disposed. In those curved portions 18a, the reinforcement member 40 is curved in a same manner inside the front handle 18. With this configuration, the displacement of the reinforcement member 40, i.e., the movement of the reinforcement member 40 with respect to the front handle 18 is prevented.

In the engine-driven cutter 10 of this working example, the front handle 18 is fixed to the main body 14 using the plurality of bolts 22. Herein, the plurality of bolts 22 penetrates the front handle 18 and the reinforcement member 40 and is tightened to the main body 14. That is, as shown in FIG. 8 and FIG. 9, a plurality of bolt holes 40c is formed in the reinforcement member 40 also in same positions as the plurality of bolt holes 18c of the front handle 18. When a structure is such that the plurality of bolts 22 penetrates the front handle 18 and the reinforcement member 40, displacement of the reinforcement member 40, i.e., movement of the reinforcement member 40 with respect to the front handle 18 can be prevented. In addition, since peripheries of the bolt holes 18c and 40c have a double structure of pipe material, a decrease in the rigidity of the front handle 18 due to formation of the bolt hole 18c can be reduced significantly.

In the engine-driven cutter 10 of this working example, the engine-driven cutter 10 includes the rotary blade 12. The axis of rotation of the rotary blade 12 extends in the left-right direction (horizontal direction). In the engine-driven cutter 10, the reaction force from the workpiece is generated in the direction perpendicular with respect to the axis of rotation of the rotary blade 12. Thus, the front handle 18 is easily bent particularly in the longitudinal portion extending along the plane perpendicular to the axis of rotation of the rotary blade 12, e.g., the longitudinal portion extending along the right side surface of the main body 14. Regarding this point, the longitudinal portion 18e where the reinforcement member 40 of the front handle 18 is disposed corresponds to the longitudinal portion extending along the right side surface of the main body 14 in the engine-driven cutter 10 of this working example. That is, the concerned longitudinal portion 18e corresponds to the longitudinal portion extending along the plane perpendicular to the axis of rotation of the rotary blade 12. Thus, the bend of the front handle 18 is sufficiently reduced with respect to the reaction force from the workpiece.

Specific embodiment of the present invention is described above, but that merely illustrates some possibilities of the teachings and does not restrict the claims thereof. The art set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

What is claimed is:
1. A handheld work machine, comprising:
a main body comprising a prime mover; and
a handle fixed to the main body and configured to be gripped by a force, the handle is a pipe, and at least one reinforcement member is disposed at a longitudinal portion of the handle that defines a part of the handle, wherein
the at least one reinforcement member is a pipe,
at least one mounting portion of the handle is defined by the part of the handle at which the at least one reinforcement member is disposed, the at least one mounting portion includes at least one bolt hole passing through both the at least one reinforcement member and the handle, the at least one bolt hole defines a recess provided in both the at least one reinforcement member and the handle, the handle includes curved portions, at least one curved portion includes the at least one reinforcement member, and the at least one reinforcement member in the at least one curved portion is curved in the same manner as the at least one curved portion.

2. The handheld work machine as in claim 1, wherein the reinforcement member is a metal material.

3. The handheld work machine as in claim 1, wherein the handle and the reinforcement member are both a same metal material.

4. The handheld work machine as in claim 1, wherein the reinforcement member is disposed inside the handle.

5. The handheld work machine as in claim 1, wherein
the handle includes a fixed portion that is fixed to the main body by a fastener, and
the fixed portion is located within the longitudinal portion where the reinforcement member is disposed.

6. The handheld work machine as in claim 1, wherein
the prime mover is configured to rotate a tool about an axis of rotation,
the longitudinal portion extends along a plane perpendicular to the axis of rotation, and
the reinforcement member resists a reaction force caused by the rotation of the tool.

7. The handheld work machine as in claim 1, wherein the at least one reinforcement member is in contact with an inner surface of the handle.

8. The handheld work machine as in claim 1, wherein the at least one reinforcement member increases the rigidity of the handle at the at least one mounting portion.

9. The handheld work machine as in claim 8, further comprising a bolt configured to pass through the at least one bolt hole to fix the handle to the main body, wherein
the recess of the bolt hole, defined by the at least one bolt hole and provided in both the at least one reinforcement member and the handle, at least partly accommodates a head of the bolt and prevents the head of the bolt from passing into an interior of the handle.

10. The handheld work machine as in claim 9, wherein the reinforcement member is in contact with an inner surface of a part of the handle that defines the recess.

11. A handle for a handheld work machine, wherein the handle is a pipe, and at least one reinforcement member is disposed at a longitudinal portion of the handle that defines a part of the handle and the at least one reinforcement member is a pipe, wherein
at least one mounting portion of the handle is defined by the part of the handle at which the at least one reinforcement member is disposed,
the at least one mounting portion includes at least one bolt hole passing through both the at least one reinforcement member and the handle,
the at least one bolt hole defines a recess provided in both the at least one reinforcement member and the handle,
the handle includes curved portions,
at least one curved portion includes the at least one reinforcement member, and
the at least one reinforcement member in the at least one curved portion is curved in the same manner as the at least one curved portion.

12. The handheld work machine as in claim 11, wherein the at least one reinforcement member is in contact with an inner surface of the handle.

13. The handheld work machine as in claim 11, wherein the at least one reinforcement member increases the rigidity of the handle at the at least one mounting portion.

14. The handheld work machine as in claim 13, further comprising a bolt configured to pass through the at least one bolt hole to fix the handle to a main body of the handheld work machine, wherein
the recess of the bolt hole, defined by the at least one bolt hole and provided in both the at least one reinforcement member and the handle, at least partly accommodates a head of the bolt and prevents the head of the bolt from passing into an interior of the handle.

15. The handheld work machine as in claim 14, wherein the reinforcement member is in contact with an inner surface of a part of the handle that defines the recess.

* * * * *